March 23, 1965     M. KAPILOW ETAL     3,174,394
PROJECTED IMAGE VIEWER AND MOUNTING STAND THEREFOR
Filed Nov. 16, 1962     3 Sheets-Sheet 1
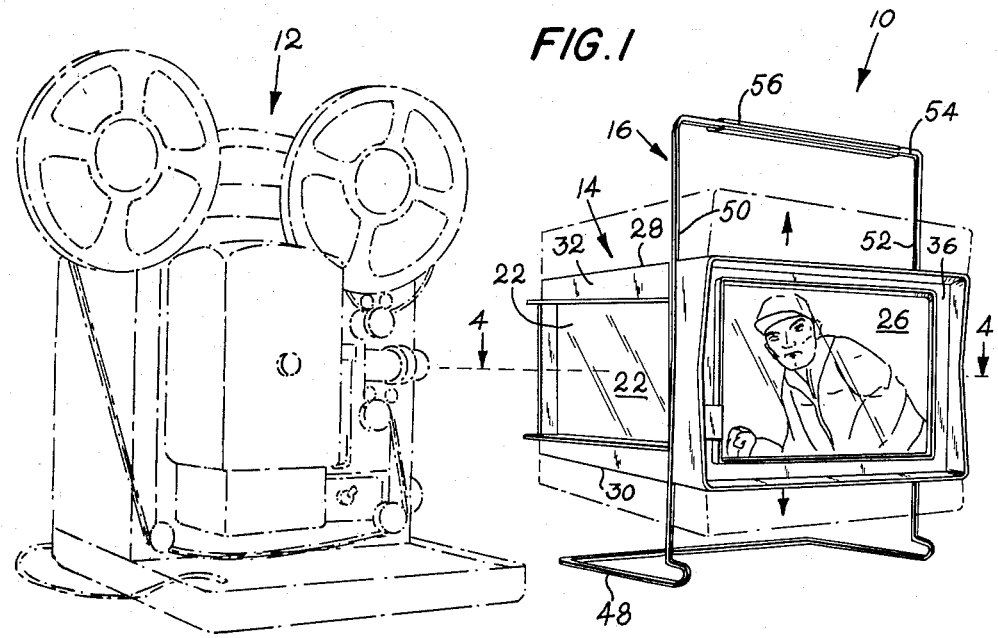
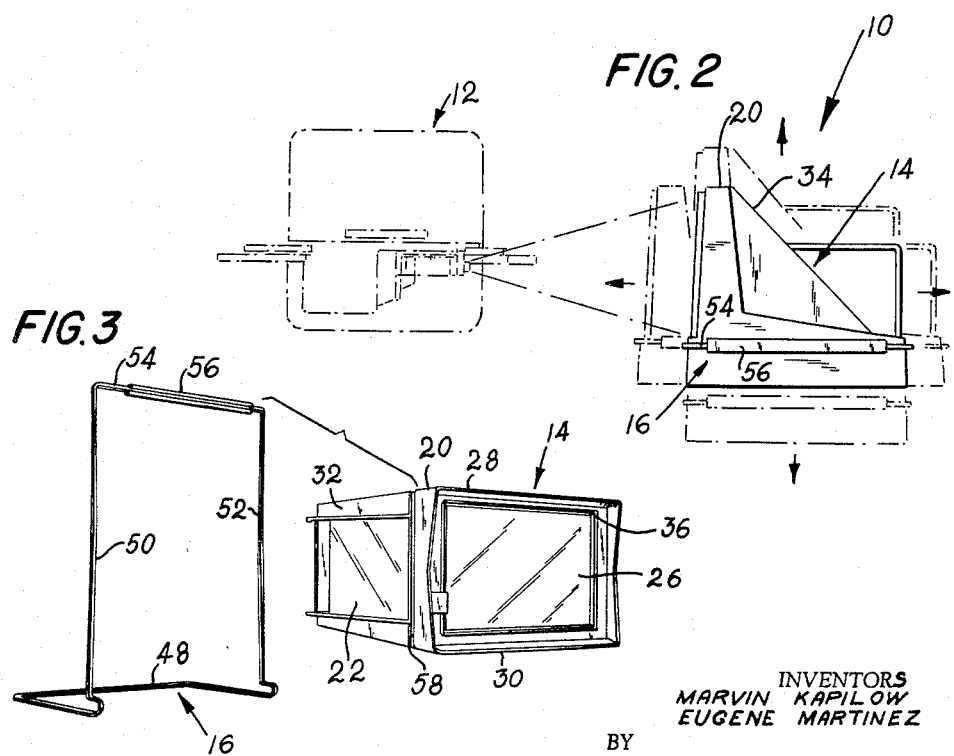
INVENTORS
MARVIN KAPILOW
EUGENE MARTINEZ
BY
*Kane, Dalsimer and Kane*
ATTORNEYS March 23, 1965 M. KAPILOW ETAL 3,174,394
PROJECTED IMAGE VIEWER AND MOUNTING STAND THEREFOR
Filed Nov. 16, 1962 3 Sheets-Sheet 2
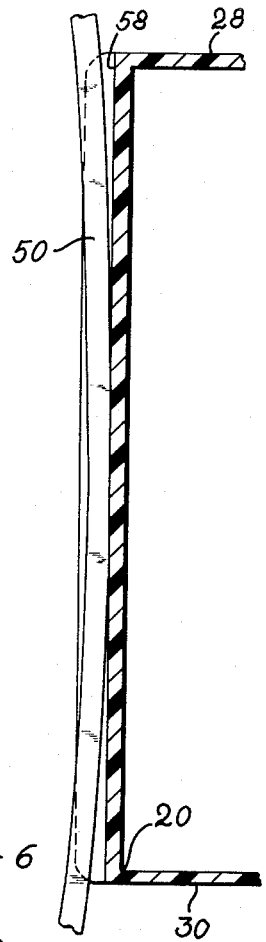
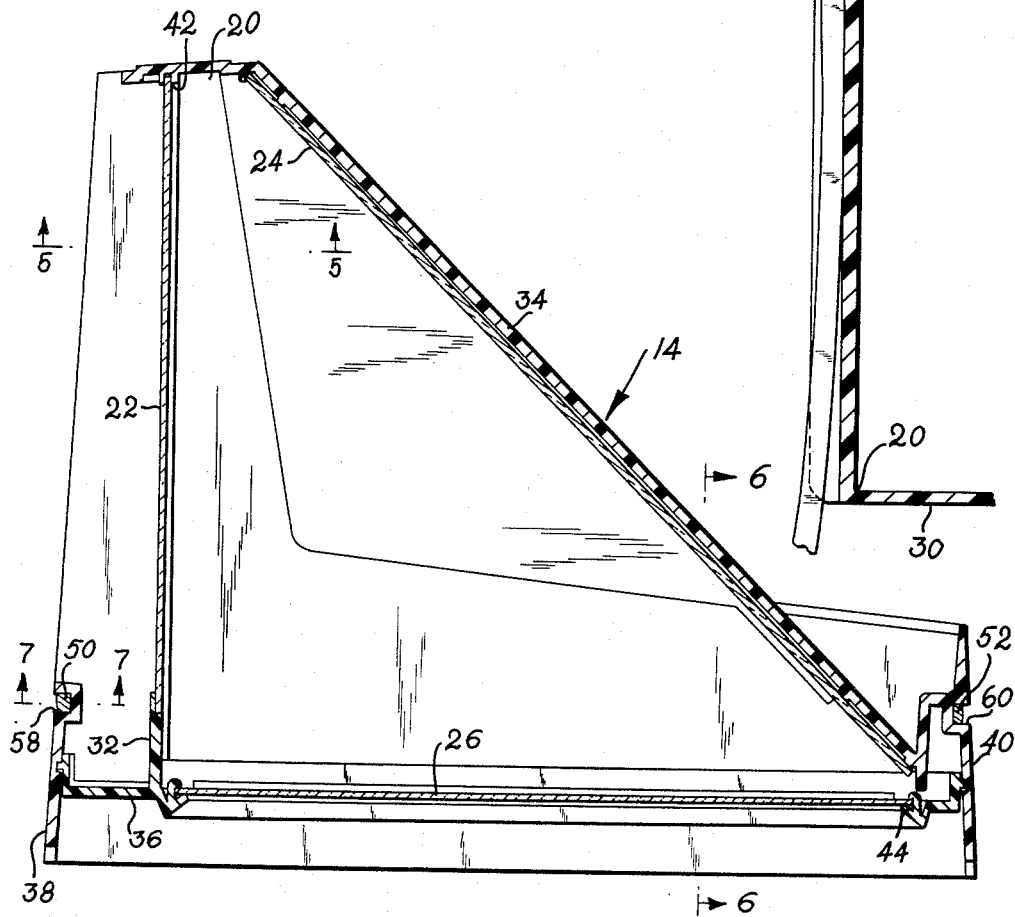
INVENTORS
MARVIN KAPILOW
EUGENE MARTINEZ
BY
Kane, Dalsimer and Kane
ATTORNEYS March 23, 1965   M. KAPILOW ETAL   3,174,394
PROJECTED IMAGE VIEWER AND MOUNTING STAND THEREFOR
Filed Nov. 16, 1962   3 Sheets-Sheet 3
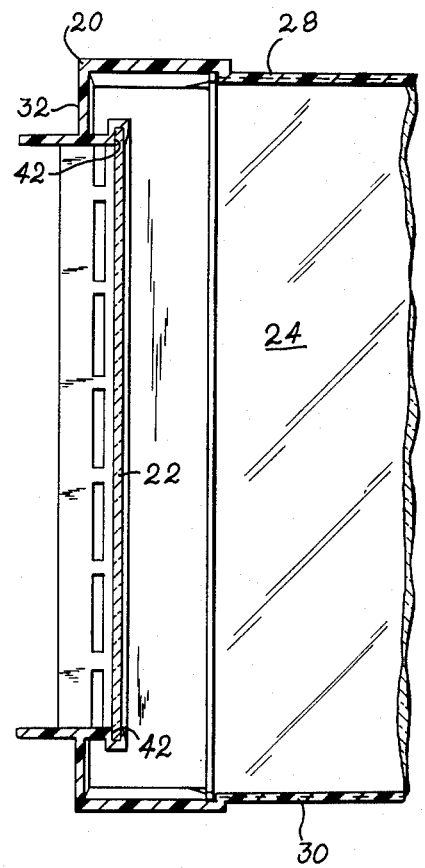
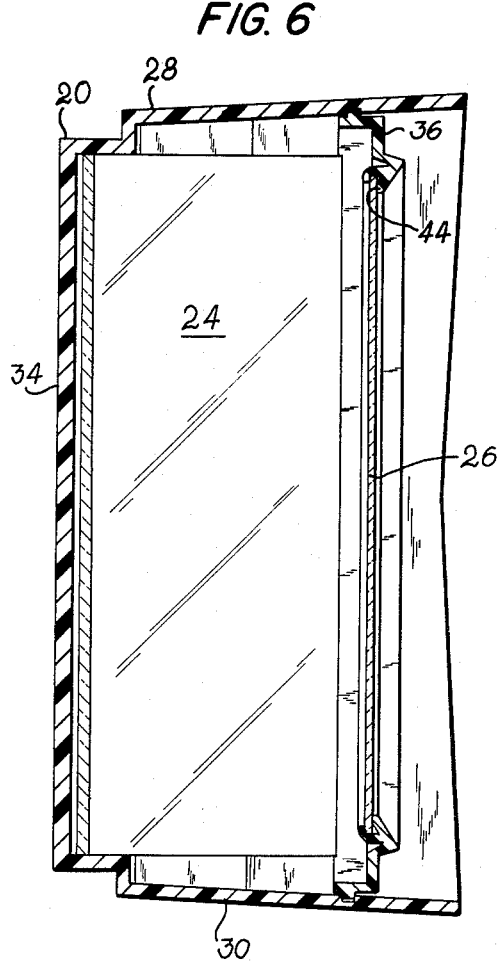
INVENTORS
MARVIN KAPILOW
EUGENE MARTINEZ
BY
Kane, Dalsimer and Kane
ATTORNEYS United States Patent Office 3,174,394
Patented Mar. 23, 1965

3,174,394
PROJECTED IMAGE VIEWER AND MOUNTING STAND THEREFOR
Marvin Kapilow, Rye, and Eugene Martinez, Irvington, N.Y., assignors of one-third to Robert H. Reibel, Croton-on-Hudson, N.Y.
Filed Nov. 16, 1962, Ser. No. 238,109
3 Claims. (Cl. 88—24)

This invention relates to a viewer and, more particularly, a viewer for projected images appearing on motion picture film or film transparencies.

In viewing motion picture film or transparencies, a suitable screen is often utilized on which the projected image is directed. In the event a screen is not available, a suitable makeshift expedient may be adopted. In this connection, either a convenient wall alone or one on which a sheet of one form or another is suspended has been known to serve, under some circumstances, with satisfactory results. However, such surfaces on which a projected image may be placed may not be at one's disposal. Needless to say, considerable time and effort would certainly be expended in mounting a screen and certainly some of the more elaborate makeshift viewing surfaces. The availability of any or all of the viewing surfaces enumerated in the above may either present a problem or serve as an inconvenience when it is desired to view motion picture film or transparencies in the time period involved or the space allotted.

The number and size of the viewing audience will certainly dictate the type of viewing surface employed. Simplicity will outweigh elaborateness and, possibly, quality projection when the viewing group is small. Furthermore, when it is desired merely to edit motion picture film, the use and erection of complex and elaborate viewing surfaces may leave much to be desired.

It is, accordingly, an object of this invention to provide a viewer for a projected image that eliminates many of the disadvantages and drawbacks of prior art viewing surfaces and, at the same time, permits rather expeditious and inexpensive viewing, notwithstanding the size of the viewing audience.

Another object is to provide a portable somewhat reduced size viewer that is capable of presenting a sizable screen and projected image, relatively easily shipped and stored, capable of showing movies or slides in daytime or in a brightly illuminated room, adapted to be used in conjunction with substantially any projector at any time and any place and one which permits editing of movie films or transparencies while on the projector.

A further object is to provide this viewer, together with accompanying mounting stand which facilitates transportation, placement, and orientation of the viewer relative to a projector whereby optimum projected image control is possible and superior viewing provided.

A viewer, incorporating the teachings of the present invention, includes a housing having a viewing screen as part of its front wall. One of the side walls of the housing is provided with an enlarged opening protected by a window or pane of transparent material. A reflecting mirror is disposed within the housing for reflecting a transmitted image onto the screen. A mounting stand interengages with surfaces of the housing such that the viewer may be adjusted in a vertical direction in order to receive the projected image. In this connection, the viewer is provided with a pair of vertically extending slots in each of the side walls of the housing for frictionally engaging vertically extending legs of the stand. The viewer, under such circumstances, is adjustable by merely shifting it upwardly or downwardly along the legs of the stand to adjust its height relative to the projected image.

Other objects and advantages will become apparent from the following detailed description to be taken in conjunction with the accompanying drawings illustrating a somewhat preferred embodiment of the invention in which:

FIG. 1 is a perspective view of a viewer and mounting stand therefor incorporating the teachings of the present invention and shown associated with a projector, in phantom, of an image placed on the viewing screen;

FIG. 2 is a top plan view of the apparatus of FIG. 1 showing the lateral adjustment and orientation of the viewer with respect to the projector to place the desired projected image on the viewing screen for optimum viewing;

FIG. 3 is an exploded view in perspective of the viewer and stand therefor;

FIG. 4 is an enlarged sectional view taken along the line 4—4 of FIG. 1;

FIG. 5 is a fragmentary sectional view taken along line 5—5 of FIG. 4;

FIG. 6 is a sectional view taken along line 6—6 of FIG. 4; and

FIG. 7 is a fragmentary sectional view taken along line 7—7 of FIG. 4.

In the drawings, a viewing unit 10, constructed in accordance with the present invention, is shown associated with a projector 12. This unit 10 includes a viewer 14 and a stand 16 therefor which cooperate with one another to enable the viewer 14 to be mounted for viewing on the selected surface and also oriented properly or, as desired, with respect to the projector 12 along substantially any optical axis. In this connection, the entire viewing unit 10 may be shifted transversely along the supporting surface by lifting the viewer 14 and stand or by merely sliding the unit along the mounting surface relative to the projector 12. Under such circumstances, the viewer 14 will be adjusted to effectively receive the projected image from the projector 12 and show it to the viewing audience. In addition, the viewer 14 is movable relative to the stand 16 therefor such that its elevation is adjustable to permit the image to adequately fill the viewing screen. With these adjustments, the manner and make of projector 12 is not a limiting factor in practicing the invention and, as stated in the above, the projector 12 may be for motion picture film or slide transparencies.

Referring now to the construction of the viewer 14, it will be observed that a housing 20 serves to advantageously mount a window, transparent pane or sheet 22 adapted to transmit therethrough the projected image, a reflecting mirror 24 for reflecting this transmitted image and a viewing screen 26 which receives the reflected image for viewing. The configuration of the housing 20 is substantially as shown and is provided with a top and bottom wall 28 and 30, respectively, a side wall 32, an oblique rear wall 34 and front wall 36. In addition, and for purposes that will be explained shortly, particularly in connection with the association of the viewer 14 with the stand 16, the housing 20 is provided with a pair of opposed and spaced substantially parallel walls 38 and 40. The housing 20 may be formed from a resinous material as well as any other suitable material. Medium impact styrene has served well for a number of successful applications. In an effort to facilitate expeditious and inexpensive assembly of the various components of the viewer, the housing 20 may be formed from material possessing some degree of resiliency and flexibility.

The sidewall 32 is provided with an enlarged opening 42 across which extends the window 22. This window 22 may be retained in place in a substantially suitable manner as, for example, by means of the illustrated snap fit. The window 22, as stated, is preferably transparent in that it is capable of permitting the transmission therethrough of an image projected by the projector 12. Under such circumstances, the window should have superior optical properties. It may also assume the form of a conventional pane of glass or a sheet suitably formed from a resinous material having the desired optical properties.

The reflecting mirror 24 is mounted interiorly of the housing 20 and, preferably, on the inside face of the rear wall 34. This association may also be in the form of a snap friction fit, as shown. Naturally, other means may be employed for properly mounting the mirror 24 in place. The mirror is, preferably, of the front surface or first surface type. The front surface should be free of pits, blemishes and imperfections. An aluminized mirror, when employed, may have a hard quartz or silicon monoxide overcoat. The coating should, preferably, not alter or tint color transmission in visible spectrum. The mirror is disposed at approximately a 45° angle with respect to the planes defined by both window 22 and screen 26. It should be understood that the present invention contemplates the use of a suitable prism or other equivalent means for purposes of directing an image onto the screen 26, if conditions would necessitate such use rather than a flat mirror 24.

The front wall 36 is also provided with an enlarged opening 44 which is covered by means of the screen 26. The screen may be secured in place on the front wall by a snap friction fit somewhat as shown. This screen may be substantially translucent and of the type that transmits a directed image impinged upon its rear face. This screen is, preferably, optically clear, free from surface defects and substantially flat within reasonable limits. For purposes of the embodiment disclosed, the screen 26 may be formed from plastic, ground glass, or any rear projection screen or be a Fresnel lens. On the other hand, it may be formed from plexiglass. One side of the screen may be coated with Lenscreen LS-60 whereas the other side, under such circumstances, may have a silicone polished surface.

Referring now to the stand 16, it will be observed that it embodies principally a bent rod which may possess a substantially rectangular or square cross section. Thus, the stand includes a base 48 for resting upon the selected surface such as a tabletop and, at the same time, permits the stand 16 to remain erect as an adequate mount for the viewer 14 at the selected elevated position. A pair of spaced legs 50 and 52 extend substantially vertically from the base 48 and, at their upper ends, are integrally united by the cross bar 54. As will be explained, the legs 50 and 52 cooperate with surfaces of the viewer 14 in providing the vertical adjustability. The cross bar 54, on the other hand, is adapted to conveniently receive a handle 56 by means of a secured snap fit association. The handle, quite obviously, facilitates the handling of the viewing unit 10 under conditions of use and transportation.

In providing for selective vertical adjustment of the viewer 14 on the stand 16, the housing walls 38 and 40 are formed with vertically extending slots or tracks 58 and 60, respectively. The slots are of a size sufficient to conveniently receive the respective stand legs 50 and 52. The surfaces of these legs and the associated walls of the corresponding slots frictionally interengage to permit the viewer 14 to be suspended on the stand 16 at substantially any of the permissible elevations thereof; and, at the same time, this association permits the viewer to be adjustable relative thereto by mere sliding movement between the interengaging surfaces. In order to provide sufficient frictional interengagement and simultaneous sliding movement, the legs 52 and 50 may be bowed inwardly, as illustrated in somewhat exaggerated form in FIGURE 7.

As a suggested manner of use of the teachings of the present invention, the projector 12 may be initially adjusted so that its lens is substantially parallel to the supporting table or surface. The viewer 14 is adjusted in height so that the lens of the projector will direct the image onto the window 22. In other words, the optical axis of the lens of the projector should intersect the center of the window 22. To raise the viewer 14, the stand 16 is held substantially stationary by grasping the handle 56; and thereafter the viewer 14 is lifted by exerting an upward force against the lower housing wall 30. To lower the viewer 14, the stand is similarly held and a downward force or pressure is exerted on the upper wall 28 of the viewer housing. If the projector has a zoom lens, it is adjusted for the largest picture size. The projected picture emanating from the projector 12 is initially focused roughly or approximately. The entire viewing unit 10 is moved towards and away from the projector 12 until the projected picture fills the screen 26. The lens of the projector may now be refocused. For a smaller picture, quite obviously, one need only move the viewing unit 10 towards the projector 12. On the other hand, for a larger picture, the viewer is moved away from the projector. In the latter instance, part of a projected scene may be viewed on a somewhat enlarged scale.

Thus, the aforenoted objects and advantages, among others, are most effectively attained. Although a single somewhat preferred embodiment of the invention has been disclosed herein, this invention is in no sense limited thereby; and its scope is to be taken as that of the appended claims.

We claim:
1. A viewer for a projected image comprising:
   a housing having top, bottom and side walls providing a pair of openings, one of said openings adapted to transmit said projected image therethrough, said housing also including a pair of opposed tracks in substantially parallel relationship;
   a vertical viewing screen extending across the other of said openings for receiving thereon the projected image for viewing;
   means interiorly of said housing for transmitting the projected image onto said screen; and
   mounting means for adjustably mounting said housing such that the viewer is adapted to be oriented with respect to said projected image to thereby place the image on the screen, said mounting means including a stand having a pair of spaced legs adapted to travel in said tracks to permit said viewer to be raised and lowered, and the housing and mounting means including frictionally interengaging surfaces defined by said tracks and spaced legs capable of relative sliding movement for adjusting the elevation of the viewer with respect to the projected image.
2. The invention in accordance with claim 1 wherein said mounting means includes a graspable handle for permitting said viewer with mounting means to be lifted and transported.
3. The invention in accordance with claim 1 wherein each of said tracks is defined by vertically extending slots in said housing, and said stand is formed from a bent rod formed into a supporting base from which said legs extend vertically into engagement with surfaces of said slots to frictionally mount said viewer in an elevated position.

References Cited by the Examiner
UNITED STATES PATENTS

| | | | |
|---|---|---|---|
| 1,746,607 | 2/30 | Readeker | 88—24 |
| 1,901,182 | 3/33 | McCandless | 88—24 |
| 2,691,916 | 10/54 | Shick et al. | 88—24 |
| 2,730,011 | 1/56 | Kleinhample et al. | 88—24 |
| 2,860,543 | 11/58 | Miles | 88—24 |

NORTON ANSHER, *Primary Examiner.*

WILLIAM MISIEK, *Examiner.*